Patented Aug. 11, 1953

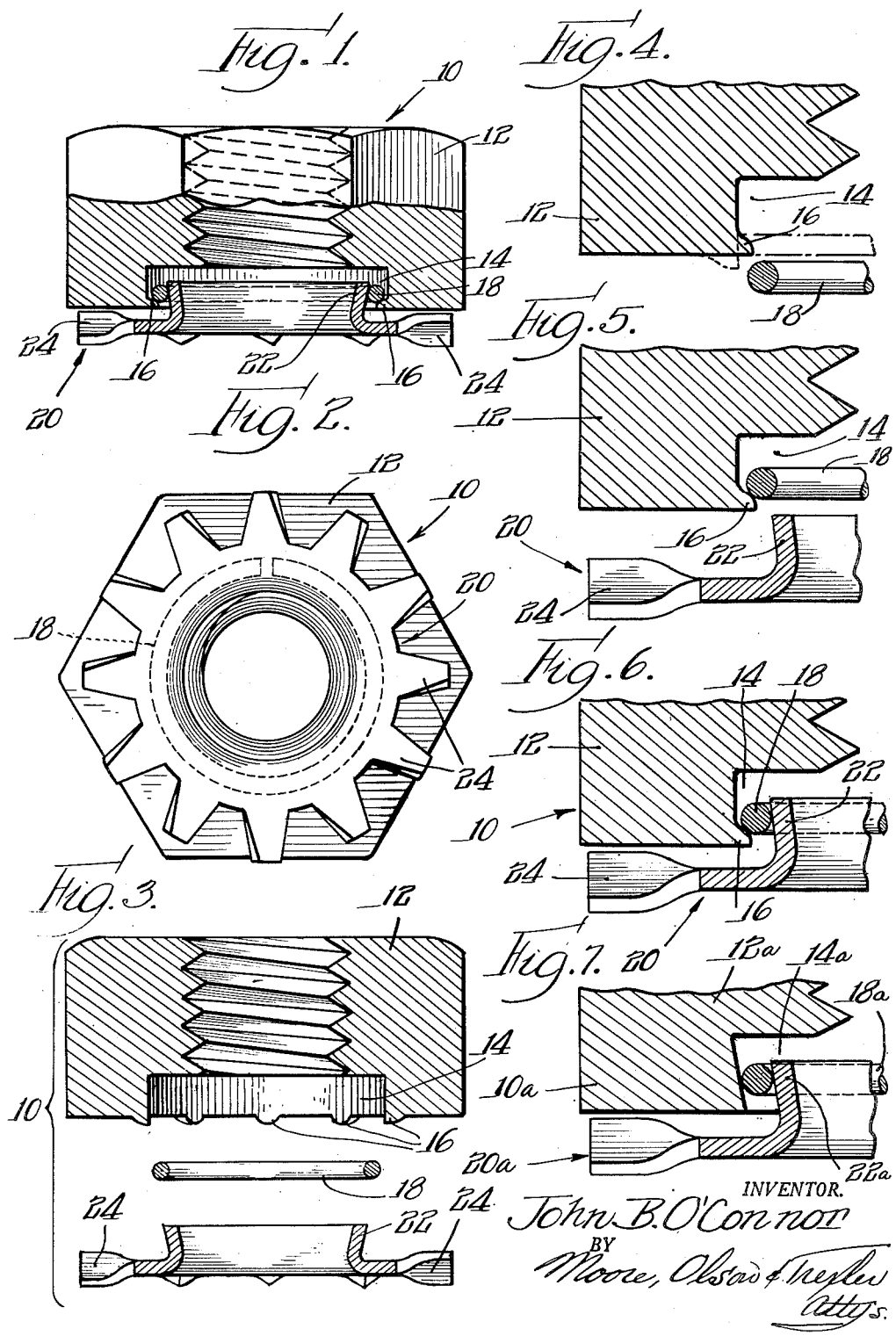

2,648,368

UNITED STATES PATENT OFFICE 2,648,368

COUPLED NUT AND LOCK WASHER

John B. O'Connor, Chicago, Ill., assignor to Illinois Tool Works, Chicago, Ill., a corporation of Illinois Application July 22, 1949, Serial No. 106,139

1 Claim. (Cl. 151—37)

The present invention relates generally to fastener units, and more particularly to preassembled nuts and lock washers.

The present invention is concerned primarily with fastener units or preassembled nut and lock washers, wherein the underside of the nut is recessed to accommodate a laterally extending portion or flange means of a lock washer. To this end the present invention proposes a fastener unit of the type just mentioned in which the lock washer and nut may be secured against inadvertent or unauthorized axial separation by auxiliary fastening means. It has been found expedient to employ an auxiliary fastening means in the form of a spring element designed to cooperate with the flange means of a lock washer and a wall section defining the recess in the nut.

One of the problems incident to the preassembly of lock washers and nuts which necessitates swaging a portion of the nut structure to provide a shelf or shoulder for securing the washer against axial separation from the nut is that of assuring free rotation of the washer after it has been swaged in place. This invention seeks to overcome this problem by interposing a resilient member between the swaged portion of the nut and the structure of the lock washer. In this manner the possibility of frictional binding which would have a tendency to render the washer non-rotatable with respect to the nut is completely obviated.

Still more specifically, the present invention contemplates the use, in the above suggested fastener unit, of a wall section which is of diminished diameter in the vicinity of the clamping surface of the nut, either in the form of a continuous margin or a plurality of swaged protuberances designed to cooperate with a resilient washer retaining member such as a spring ring.

The foregoing and other objects and advantages will be more apparent from the following detailed description, when considered in connection with the accompanying drawings, wherein—

Fig. 1 is a side elevational view shown partly in section of a fastener unit or preassembled nut and lock washer representing one embodiment of the present invention;

Fig. 2 is a view of the underside of the fastener unit shown in Fig. 1;

Fig. 3 is an exploded central sectional view showing the nut, lock washer and the auxiliary washer retaining ring prior to the assembly of the parts, and before the axially extending projections of the nut are swaged inwardly to the position illustrated in Fig. 1;

Fig. 4 is an enlarged fragmentary sectional view of the lower left corner of the nut of Fig. 3 after the inwardly extending circumferentially spaced protuberances have been swaged, a portion of the spring being shown in association with the nut just prior to the assembly of said parts;

Fig. 5 is a view similar to Fig. 4 after the washer retainer spring has been snapped into position but before the lock washer has been telescopically associated with the nut and spring;

Fig. 6 is a view similar to Fig. 5 showing the lock washer secured against axial separation from the nut by the auxiliary fastening element or spring; and Fig. 7 is a view similar to Fig. 6 illustrating a modified form of wall section, namely, a wall section comprising a frusto-conical surface, as distinguished from the combination of cylindrical surface and circumferentially spaced protuberances illustrated in Figs. 1 to 6, inclusive.

Referring now to the drawing more in detail, wherein like numerals have been employed to designate similar parts throughout the various views, it will be seen that one embodiment of the invention consists of a fastener unit or preassembled nut and lock washer designated generally by the numeral 10. The fastener unit 10 comprises a nut member 12 provided on its clamping side with a recess 14. In the structure disclosed in Figs. 1 to 6, inclusive, the recess 14 is initially formed, as illustrated in Fig. 3. It will be noted that the recess 14, as shown in Fig. 3, is defined by a cylindrical wall section which terminates in a plurality of projections or nubs 16. These nubs are subsequently swaged inwardly by the application of sufficient axial pressure so as to assume the position indicated in Figs. 1, 4, 5 and 6. Thus, when swaged inwardly, these nubs or protuberances 16 reduce the diameter of the wall section defining the recess 14 and provide a shelf or abutment for a washer retaining element or split ring 18.

In the embodiment disclosed in Figs. 1 to 6 of the drawing, the ring 18 is sprung into the recess 14 over the protuberances 16 prior to the association therewith of a lock washer 20. The lock washer 20 includes a laterally or axially extending flange 22 and a plurality of twisted prongs 24 extending radially outward from the lower margin of the flange 22. The normal external diameter of the retaining ring 18 is somewhat larger than the diameter defined by the inner extremities of the swaged protuberances 16 so as to require the ring to be snapped over said protuberances. Likewise, the outer diameter of the free margin of the flange 22 is somewhat larger than the normal inner diameter of the ring 18. Thus, to effect interlocking telescopic association of the flange means 22 with the spring retainer element 18, the element 18 must be expanded sufficiently to accommodate the larger diameter of the free margin of the washer flange 22. After the free margin of the flange 22 has been telescopically forced into association with the ring 18, the parts occupy the position illustrated in Figs. 1 and 6. It will be noted that the flange means 22 is flared outwardly so as to provide an annular relieved or undercut area for receiving the ring 18. In order to effect separation of the washer with respect to the nut after the parts have assumed the assembled relation shown in Fig. 6, it is necessary to overcome the tension of the spring.

In Fig. 7 a slightly modified form of the invention is disclosed, and this fastener unit is designated generally by the numeral 10a. The fastener unit 10a comprises a nut 12a and a lock washer 20a. A recess 14a is provided in the nut 12a, and this recess is defined by a wall section of frusto-conical form. This frusto-conical wall cooperates with a resilient retainer member or spring 18a for securing the lock washer 20 against separation. The only structural difference between the fastener unit 10a and the fastener unit 10 is in the arrangement of the wall section which defines the washer accommodating recess, the wall section of Fig. 7 being of frusto-conical shape and the wall section defining the recess 14 being of cylindrical shape over a part of its extent and terminating in a plurality of inwardly extending spaced protuberances 16. In both forms the minimum diameter of the wall section is positioned in the vicinity of the clamping surface of the nut so as to cooperate with the split retainer ring and the washer flange in securing the parts against axial separation.

As previously set forth herein, spaced protuberances 16 cooperate with the retainer spring member 18 for securing the washer against axial displacement. It should be understood in this connection that the invention also contemplates the use of a continuous annular protuberance, as indicated by the dot and dash lines in Fig. 4. Obviously, the inner diameter defined by this swaged continuous flange or protuberance would correspond with the diameter defined by the inner extremities of the protuberances 16.

From the foregoing it will be clear that the present invention contemplates a preassembled nut and washer of extremely practical and simple design. The counterbore or recess on the clamping side of the nut provides a convenient receptacle for the washer flange. By employing the split ring washer retainer the washer may be securely held against axial separation with respect to the nut, and at the same time free to rotate with respect to the nut. In lock washers employing the type of locking prongs disclosed herein, free rotation of the nut with respect to the washer during the initial application of the fastener unit to the work increases the locking effectiveness of the washer teeth.

While certain specific structural details have been disclosed herein, it will be apparent that other modifications and changes may be made herein without departing from the spirit and scope of the appended claim.

The invention is hereby claimed as follows:

A three-piece fastener unit including a nut having a counterbore in the clamping surface thereof adjacent and around the threaded portion thereof, said counterbore being bounded by a frusto-conical wall section having the reduced diameter thereof in the vicinity of said clamping surface, a compressible sheet metal washer member having a central aperture defined by axially extending flange means of frusto-conical configuration projecting into said counterbore, the increased diameter of said flange extending toward the free margin thereof, the increased diameter of said flange means being less than the reduced diameter opening of the counterbore and positioned axially inwardly thereof and within said counterbore, the remainder of said washer member extending radially outwardly from the base of said flange means and axially compressible against the clamping surface of the nut, and an annular split retainer spring element interposed between the increased diameter portion of the flange means and the reduced diameter opening of said counterbore and of a radial thickness greater than the annular gap between the increased diameter portion of the flange means and the reduced diameter opening of said counterbore to counteract axial separation of the washer member and nut, the axial depth of the counterbore being greater than the combined axial extent of the increased diameter portion of the flange means, the reduced diameter of the counterbore and the interposed retainer spring when in unclamped position to thereby provide sufficient clearance between the free edge of the flange means and the bottom of the counterbore to permit axial movement of the flange means into the counterbore as the radial portion of the washer member is compressed during clamping action of the nut, the diameter of the counterbore between the reduced diameter and the bottom thereof being sufficiently large to permit axial shifting of the retainer spring with respect to the counterbore wall and washer flange, the annular retainer spring having a normal internal diameter which is less than the maximum outer diameter of the washer flange and an outer diameter which is normally less than the maximum diameter of the counterbore, the inner margin of the side of the retainer spring facing the counterbore opening being flared to facilitate telescopic association of the washer flange therewith when said flange is inserted within the counterbore, the depth of the counterbore and axial length of the washer flange being such that when the free margin of said flange is fully inserted within the counterbore it will extend sufficiently beyond the minimum internal diameter of the annular spring to effect assembly of the spring with the flange.

JOHN B. O'CONNOR.

References Cited in the file of this patent

UNITED STATES PATENTS

| Number | Name | Date |
| --- | --- | --- |
| 1,638,788 | Vissering | Aug. 9, 1927 |
| 2,021,051 | Desbrueres | Nov. 12, 1935 |
| 2,225,654 | Olson | Dec. 24, 1940 |

FOREIGN PATENTS

| Number | Country | Date |
| --- | --- | --- |
| 1,315 of 1901 | Great Britain | Jan. 21, 1901 |
| 81,356 | Switzerland | June 16, 1919 |
| 508,300 | France | Oct. 6, 1920 |
| 110,337 | Switzerland | Aug. 1, 1925 |